US010401478B2

(12) United States Patent
Pais et al.

(10) Patent No.: US 10,401,478 B2
(45) Date of Patent: Sep. 3, 2019

(54) DETECTING PRESENCE, SIZE, AND DIRECTION OF MOTION OF AN OBJECT USING RADIO-FREQUENCY TECHNIQUES

(71) Applicant: MOTOROLA MOBILITY LLC, Chicago, IL (US)

(72) Inventors: Martin R. Pais, North Barrington, IL (US); Suzette Marie Aguilar, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 412 days.

(21) Appl. No.: 14/746,902

(22) Filed: Jun. 23, 2015

(65) Prior Publication Data
US 2016/0377703 A1 Dec. 29, 2016

(51) Int. Cl.
*G01S 7/41* (2006.01)
*G01S 13/04* (2006.01)
*G01S 13/58* (2006.01)

(52) U.S. Cl.
CPC .............. *G01S 7/411* (2013.01); *G01S 13/04* (2013.01); *G01S 13/58* (2013.01)

(58) Field of Classification Search
CPC ...................................................... G01S 7/411
USPC ......................................................... 342/27
See application file for complete search history.

(56) References Cited

U.S. PATENT DOCUMENTS

| 2008/0081631 | A1* | 4/2008 | Rofougaran | H01Q 1/38 455/452.1 |
| 2011/0012743 | A1* | 1/2011 | Van Gorp | G08C 17/02 340/686.6 |
| 2013/0033381 | A1* | 2/2013 | Breed | B60T 1/005 340/568.1 |
| 2013/0322562 | A1* | 12/2013 | Zhang | H04B 7/0404 375/267 |
| 2014/0369558 | A1* | 12/2014 | Holz | G06K 9/00201 382/103 |
| 2014/0376773 | A1* | 12/2014 | Holz | G06F 1/1686 382/103 |

OTHER PUBLICATIONS

Branislav Kusy, Akos Ledeczi, Xenofon Koutsoukos: "Tracking mobile nodes using RF Doppler shifts", ACM Conference on Embedded Networked Sensor Systems( SenSys), 2007, all pages.

* cited by examiner

*Primary Examiner* — Peter M Bythrow
*Assistant Examiner* — Helena H Seraydaryan
(74) *Attorney, Agent, or Firm* — SBMC (57) ABSTRACT

Various embodiments transmit a radio-frequency ("RF") beam using two or more RF antennas of a mobile device, e.g. a mobile phone. The RF signals that make up the RF beam are selected to create an emission pattern associated with object detection. Some of the RF antennas can be multi-purpose, where in addition to transmitting the RF beam, the antennas are used for RF communications. Upon receiving a reflected radiation pattern of the RF beam from an object, the reflected radiation pattern is analyzed to identify characteristics of the object. Depending upon what characteristics have been identified, one or more actions can be automatically performed.

20 Claims, 8 Drawing Sheets

DETECTING PRESENCE, SIZE, AND DIRECTION OF MOTION OF AN OBJECT USING RADIO-FREQUENCY TECHNIQUES

TECHNICAL FIELD

The present disclosure is related to object detection and, more particularly, to object detection using radio-frequency techniques.

BACKGROUND

As computing devices evolve, there is a push to provide increased functionality within the devices to meet ongoing consumer expectations. Yet, device form factors can tend to limit the amount of components that can be contained within a particular device. For example, smart mobile devices, such as phones, have fairly small form factors which place physical limits on the components contained within. Thus, the evolution of a computing device often includes consideration of a balance between new features to be added to the computing device and the physical constraints of the device's form factor.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The evolution of computing devices has followed a trend where a computing device typically offers more functionality than its predecessor. As part of the evolution, it can be advantageous to enable old and new functionality in a more efficient or automated manner. For example, consider the evolution of a mobile device such as a mobile phone. In one version of the mobile device, the device might include basic call functionality and some applications. In a subsequent version, the designers might decide to include some automated features to enhance the device's functionality. For example, after a period of inactivity, the device may automatically switch its display to a power-saving mode and then automatically wake up responsive to some external environmental condition. Consider a scenario where designers decide to include new and different hardware components in the device to enable the device to automatically wake up. The new and different hardware components may be hardware components that are not typically included in mobile devices. Including new and different hardware components in the mobile device may impact its form factor as well as increase costs associated with building the mobile device.

The embodiments described herein utilize components of a mobile device that are typically used for a primary purpose other than detecting objects and object properties. That is, these components generate radio-frequency ("RF") signals that are primarily utilized to provide mobile-device functionality other than object detection. These very same RF signals are also used for a secondary purpose pertaining to detecting objects and object properties. For example, the mobile device can transmit an RF beam using two or more RF antennas. The RF antennas may serve a primary purpose of enabling calls to be made. The RF signals that make up the RF beam can be selected to create an emission pattern for the secondary purpose of enabling object detection. If an object is present, then the RF beam is reflected and can be received by the mobile device in the form of a reflected radiation pattern. The reflected radiation pattern can then be analyzed to detect the object and various object properties. Based on the presence of an object, the mobile device can automatically present various functionality to a user, such as performing various actions described below in more detail.

Figure 1:
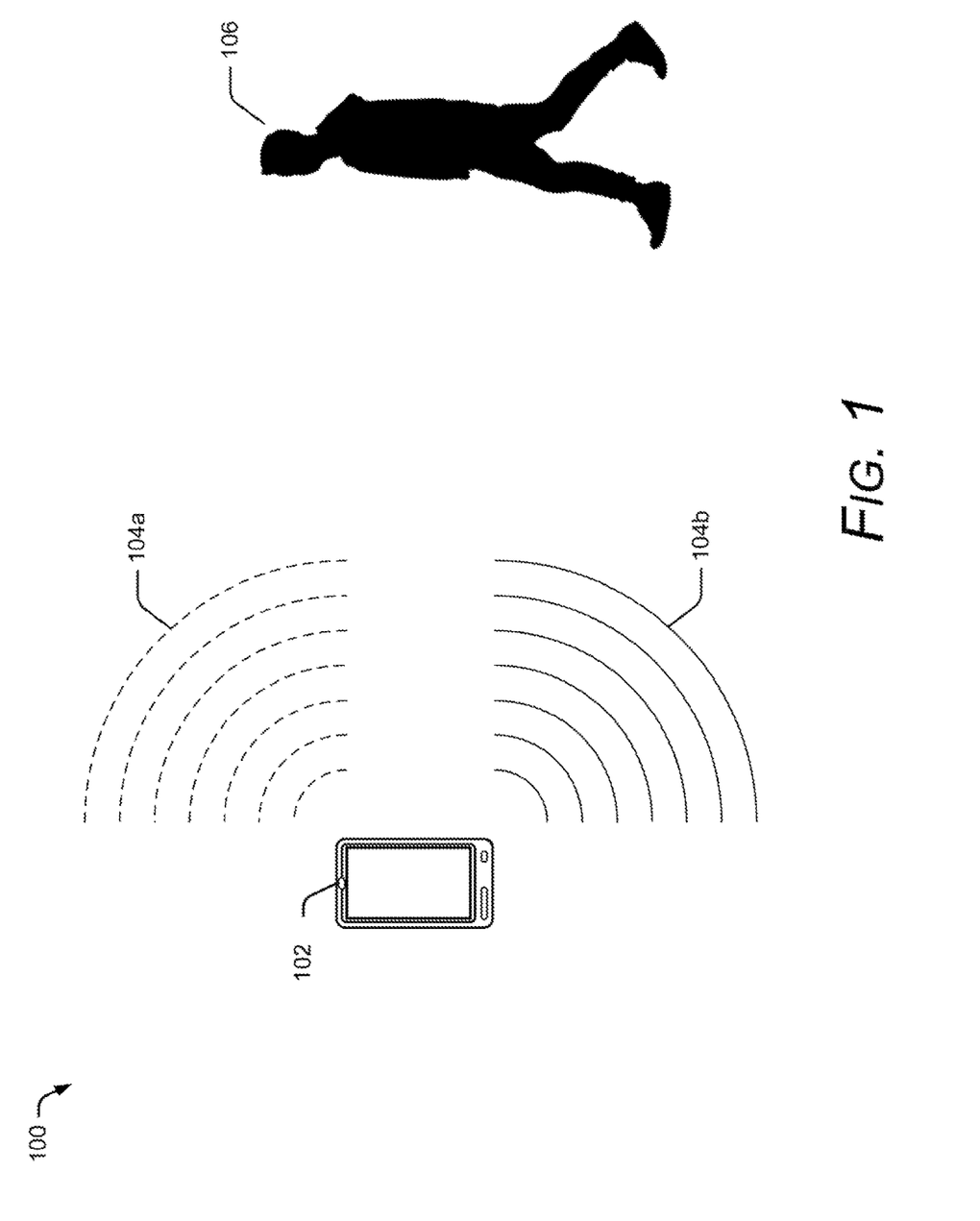
FIG. 1 is an overview of a representative environment in which the present techniques may be practiced.

FIG. 1 illustrates an example operating environment 100 that includes a mobile device in the form of a mobile phone 102. It is to be appreciated and understood that the mobile device could be embodied as any other suitable type of device without departing from the scope of the claimed subject matter. Mobile phone 102 is capable of transmitting and receiving RF signals, such as signal transmission 104a and signal transmission 104b.

Signal transmission 104a and signal transmission of 104b each represent an RF transmission from a respective antenna of mobile phone 102. To denote that these transmissions originate from separate antennas, signal transmission 104a is illustrated with dashed lines, while signal transmission 104b is illustrated with solid lines. Here, FIG. 1 is illustrated with two signal transmissions radiating from respective antennas. However, it is to be appreciated and understood that mobile phone 102 can transmit any suitable number of signals, and in any suitable configuration, without departing from the scope of the claimed subject matter. For example, signal transmission 104a radiates from the top right-hand corner of mobile phone 102 at a 45° angle. Conversely, signal transmission 104b radiates from the lower right-hand corner of mobile phone 102 at a −45° angle. The direction, frequency, or strength at which these signals are transmitted can be based on any number of characteristics or properties, such as the relative physical location of the respective antennas to one another, the number of signals being transmitted, the desired breadth of physical coverage by the combined signal transmissions, a desired emission pattern, an anticipated object within proximity of mobile phone 102, and so forth. At times, the signal transmissions are coherent transmissions, where the signals are synchronized in frequency or phase.

FIG. 1 also includes an object 106, which is illustrated here as a person walking towards mobile phone 102. As object 106 approaches mobile phone 102, the object enters into a space containing signal transmission 104a and signal transmission 104b. When signal transmission 104a and signal transmission 104b reach object 106, at least a portion of the signals reflects off of object 106 and travels back to mobile phone 102. The reflected RF signals can be received by mobile phone 102 in any suitable manner, such as through the same antenna used to send the signal transmissions or through different antennas. In some cases, the transmission/receiving antennas are multi-purpose, as pointed out above, in that the antennas can be used for RF communication, as well as for object detection. The reflected RF signals are then analyzed by mobile phone 102 to discern information about object 106, as further discussed below. In some cases, when an object or a particular property of the object has been identified, mobile phone 102 automatically presents various functionality by executing a response action.

Figure 2:
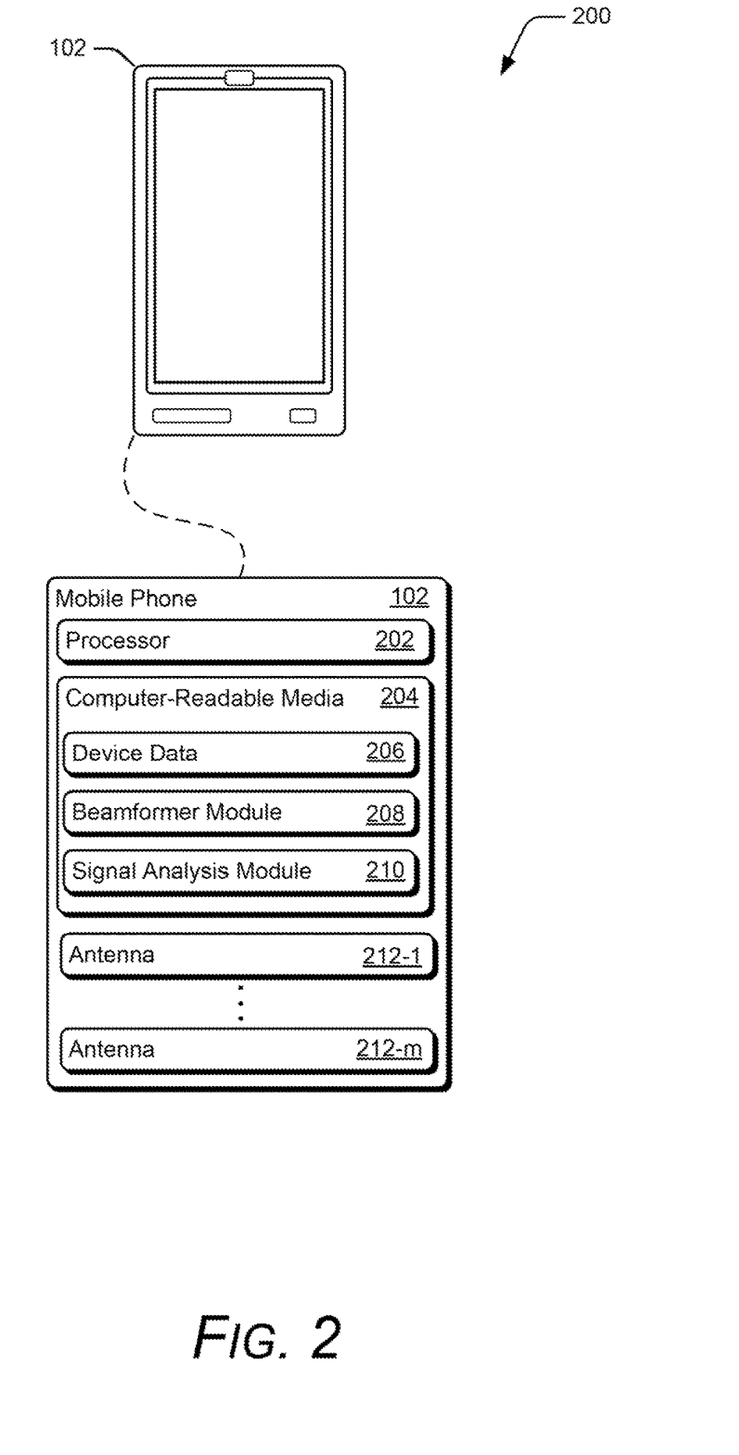
FIG. 2 is a generalized schematic of the computing device of FIG. 1.

Having considered an example operating environment, consider now an example mobile phone. FIG. 2 illustrates an example embodiment 200 of mobile phone 102. Mobile phone 102 can include many different types of computing or electronic components that are capable of using RF signals to detect an object or its properties.

Mobile phone 102 includes a processor 202, which may be configured as a single or multi-core processor capable of enabling various functionalities of the mobile phone. In some cases, processor 202 includes a digital-signal processing subsystem for processing various signals or data of the mobile phone. Processor 202 may be coupled with, and may implement functionalities of, any other components or modules of mobile phone 102 that are described herein.

Mobile phone 102 includes computer-readable media ("CRM") 204. CRM 204 includes device data 206 which generally denote various types of data such as an operating system, firmware, or applications of mobile phone 102 that are executable by processor 202. Device data 206 may include various user data, such as captured signal data (e.g., sampled values of a received signal), music, documents, emails, contacts, and the like. CRM 204 also includes beam-former module 208 and signal-analysis module 210, which in this example are embodied as computer-executable code stored on CRM 204.

Beam-former module 208 allows mobile phone 102 to generate and transmit RF signals that are designed to create emission patterns that contain constructive or destructive interference. More particularly, beam-former module 208 influences the frequency or phase of each RF signal transmitted from an antenna of mobile phone 102 to better determine the presence of objects in close proximity, as further described below. Beam-former module 208 can include knowledge on how to interface with hardware contained within mobile phone 102 to control the transmitted RF signals. In some cases, beam-former module 208 weights how each transmitted RF signal is amplified or weights how each received or reflected RF signal is amplified. Thus, beam-former module 208 includes logic to modify RF signals such that an object can be further identified based upon the resultant reflected RF signals.

Signal-analysis module 210 analyzes received RF signals, such as the resultant reflected RF signals as discussed above and below, to identify various characteristics or properties of an object. For instance, signal-analysis module 210 can determine that an object is within close proximity by simply identifying that a reflected RF signal has been received. Signal-analysis module 210 can identify more complex characteristics of the object by analyzing various properties of the reflected RF signal. For example, signal-analysis module 210 can measure a size of an object by using knowledge of which emission patterns were transmitted in the outgoing RF signals, which direction the outgoing RF signals were transmitted, Doppler shift in the received signals, and the like. Any suitable type of characteristic or property can be determined, including whether the object is moving towards or away from mobile phone 102, a velocity of the object, and so forth. In some embodiments, detecting a particular characteristic of the object can subsequently cause one or more actions to be performed by mobile phone 102, as will become apparent below.

Mobile phone 102 also includes multiple antennas, here illustrated as antenna 212-1 through antenna 212-$m$, where m represents an arbitrary number. In some embodiments, at least some of the antennas have a dedicated or primary purpose (i.e., a first antenna dedicated to Bluetooth communications, a second antenna dedicated to Global System for Mobile Communication communications, a third antenna dedicated to wireless local area network ("Wi-Fi") communications, and so forth). These antennas with a dedicated purpose can be temporarily re-purposed for a secondary purpose by transmitting an RF signal to permit object detection. Alternately or additionally, an antenna with a dedicated purpose can be temporarily re-purposed to receive a reflected RF signal to permit object detection. By re-purposing antennas to have secondary object detection functionality, mobile phone 102 can perform object detection using RF signals without a need to add extra hardware components that are typically not used in wireless communications.

Generally, any of the functions described herein can be implemented using software, firmware, hardware (e.g., fixed-logic circuitry), manual processing, or a combination of these implementations. The terms "module," "functionality," "component," and "logic" as used herein generally represent software, firmware, hardware, or a combination thereof. In the case of a software implementation, the module, functionality, component, or logic represents program code that performs specified tasks when executed on or by a processor. The program code can be stored in one or more computer-readable memory devices.

Having described example operating environments and an example mobile phone in which various embodiments can be utilized, consider now a discussion of basic RF signal properties in accordance with one or more embodiments. An RF signal (also known as a radio wave) is one form of electromagnetic radiation. Radio waves are often characterized by their frequency or wavelength, and, generally, the radio-wave spectrum can loosely be classified as existing in the frequency range of 8.3 kHz to 3000 GHz. Being a form of electromagnetic radiation, RF signals adhere to various wave and particle properties.

Figure 3A:
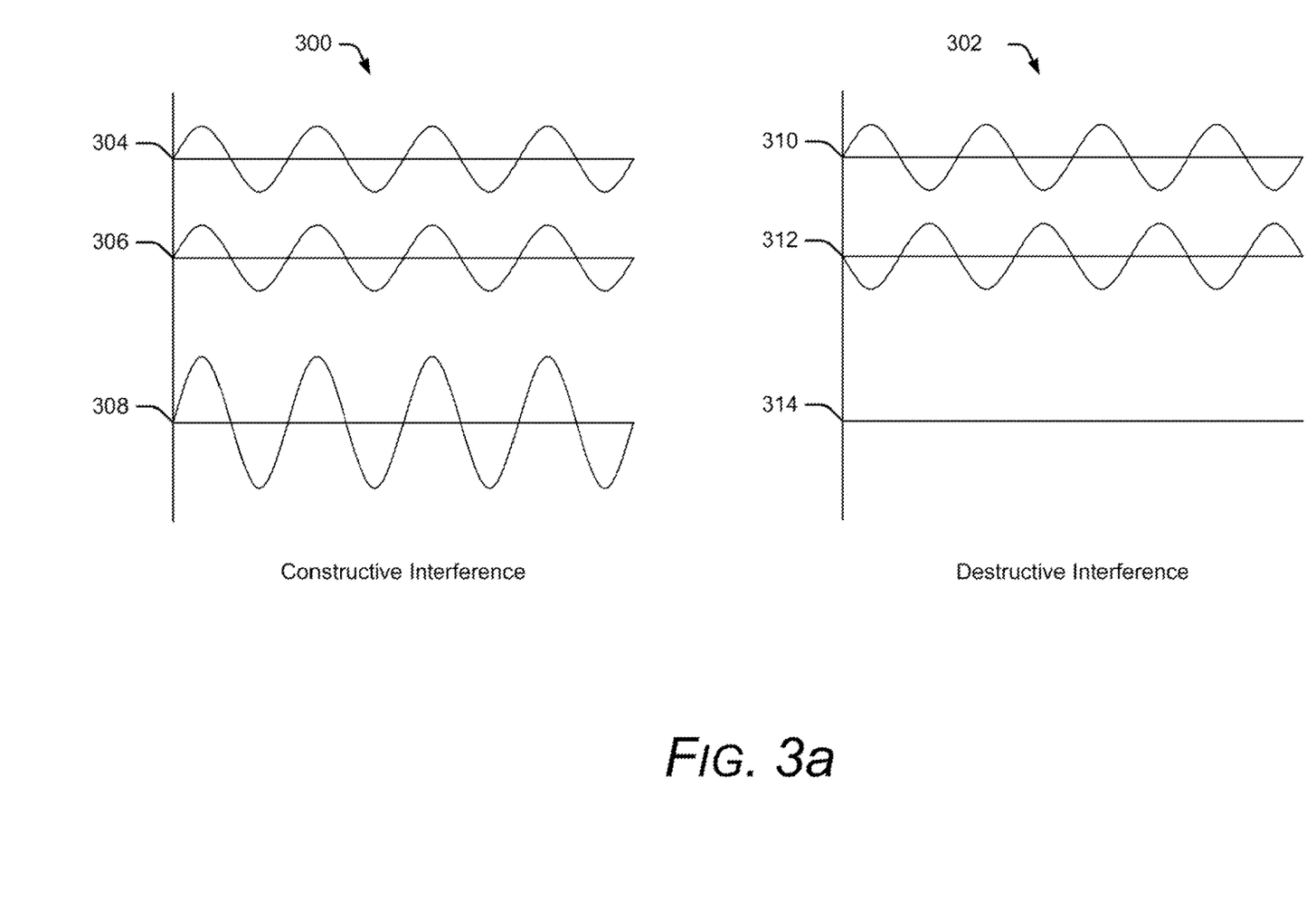
FIGS. 3a, 3b, and 3c together illustrate general signal properties.

To further illustrate, consider FIG. 3a. FIG. 3a includes a Constructive Interference graph 300 and a Destructive Interference graph 302.

Constructive Interference graph 300 demonstrates how two signals can constructively interfere with one another. Here, signal 304 and signal 306 represent two coherent radio signals, where the signals are transmitted at a same frequency and in phase with one another. Resultant signal 308 illustrates the combined effect, where signal 308 is at the same frequency as signal 304 and signal 306. However, the peak value of signal 308 is twice the peak value of signal 304 or signal 306. For the simplicity of discussion purposes, signal 304 and signal 306 are illustrated as having the same amplitude, phase, and frequency as one another. However, aspects of the constructive interference property described here are still applicable when there are variations between the signals.

Destructive Interference graph 302 demonstrates how signals can destructively interfere with other. As in the case with signal 304 and signal 306, signal 310 and signal 312 represent two radio signals transmitted at the same frequency. However, differing from signal 304 and signal 306, these two signals are out of phase with one another, where signal 312 is the 180° out of phase (alternately expressed as π radians) with signal 310. Subsequently, when these two signals interfere with one another, they effectively cancel each other out, illustrated here with signal 314. Note that when signal 310 is at a peak value, signal 312 is at its lowermost value. Since signal 310 and signal 312 are illustrated in Destructive Interference graph 302 as having a same and amplitude, the net effect is zero. It is to be appreciated that aspects of the destructive interference property described here are still applicable when there are variations between the signals.

Figure 3B:
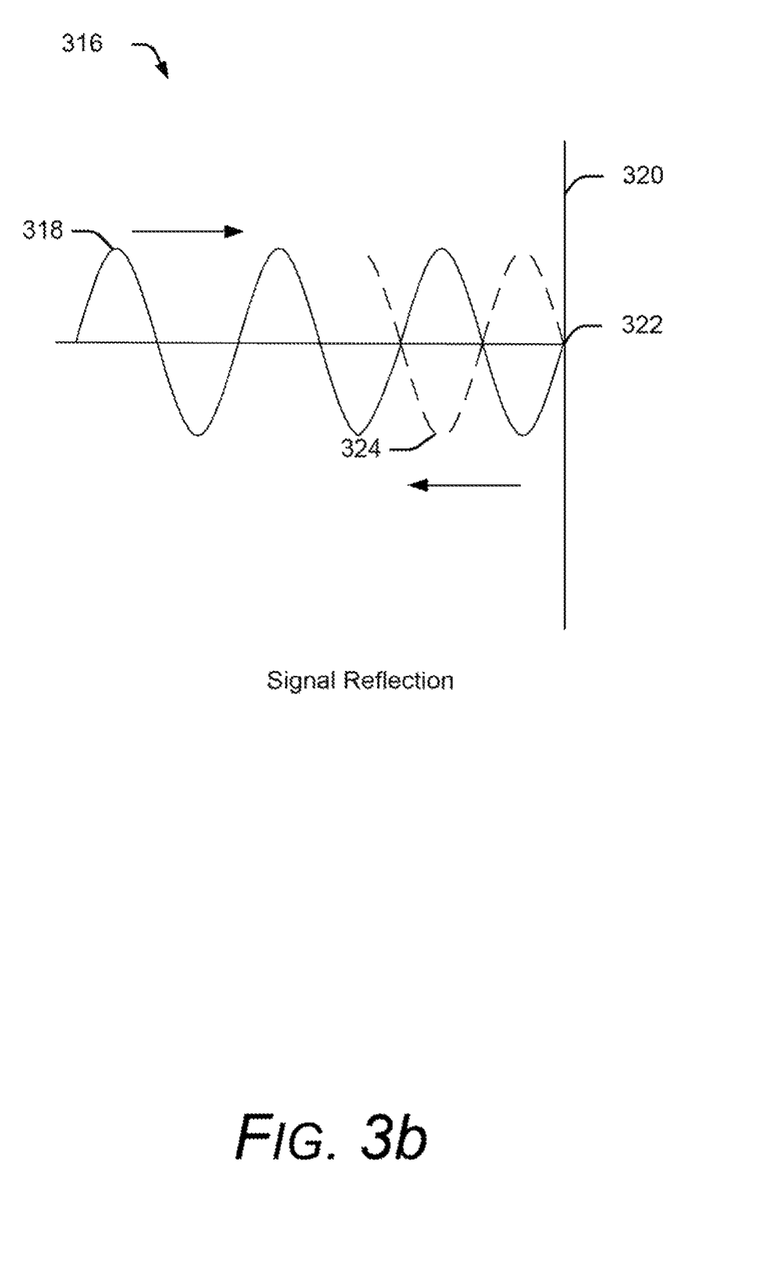

Now consider FIG. 3b which includes a Signal Reflection graph 316, which demonstrates simple aspects of an RF signal as it reflects off of an object. Here, signal 318 is illustrated as a solid line and represents an RF signal that is traveling towards object 320, as indicated by the arrow pointing towards object 320. While object 320 is drawn as a line, this is used simply for discussion purposes. It is to be appreciated that object 320 can be an object of any shape and size without departing from the scope of the claimed subject matter. At point 322, signal 318 impacts object 320 and is reflected back. Note that in this example, signal 318 is traveling perpendicular to object 320 (e.g., signal 318 is traveling with 0° deviation from the x-axis, object 320 has 90° deviation from the x-axis) at point 322 when the two impact each other. Subsequently, reflected signal 324, illustrated with a dashed line, is reflected back at this same angle and direction. However, signal 318 can alternately travel towards object 320 at a different incoming angle, which, in turn, affects the direction and angle at which reflected signal 324 travels.

As illustrated above, two waves of a same wavelength will interfere constructively or destructively upon intersecting. This creates a spatial fringe-like pattern that exhibits itself as approximately parallel planes of low and high intensity power. The distance or width between the fringes ("WF") is dependent on the wavelength of the radiation and the angle between the sources according to the following equation, where the wavelength is represented by λ, and the angle between the sources is represented by θ:

$$W_F = \frac{\lambda}{2\sin\frac{\theta}{2}}$$

If the two waves have different wavelengths/frequencies, the waves will create a Doppler frequency ("FD"), i.e., a fringe pattern that is traversing in space as follows, where F1 and F2 represent the emitted frequencies from respective antennas, and FD is the observed Doppler frequency shift:

$$F_D = F_1 - F_2$$

This, in effect, causes the interference pattern to traverse a measurement volume in time at a velocity given by:

$$V = F_D * W_F$$

Now consider when the two signals are part of a beam signal generated by a beam former, such as beam former 208 of FIG. 2. Depending on the "diameter" of the beam of emitted radiation, the intersection of the two beams, in effect, creates an intersection volume or "measurement volume." Objects that are resident within this volume will then absorb, transmit, or reflect the radiation pattern imposed on them. By measuring the reflected wave, one can then determine the presence, size, and motion of the object.

Figure 3C:
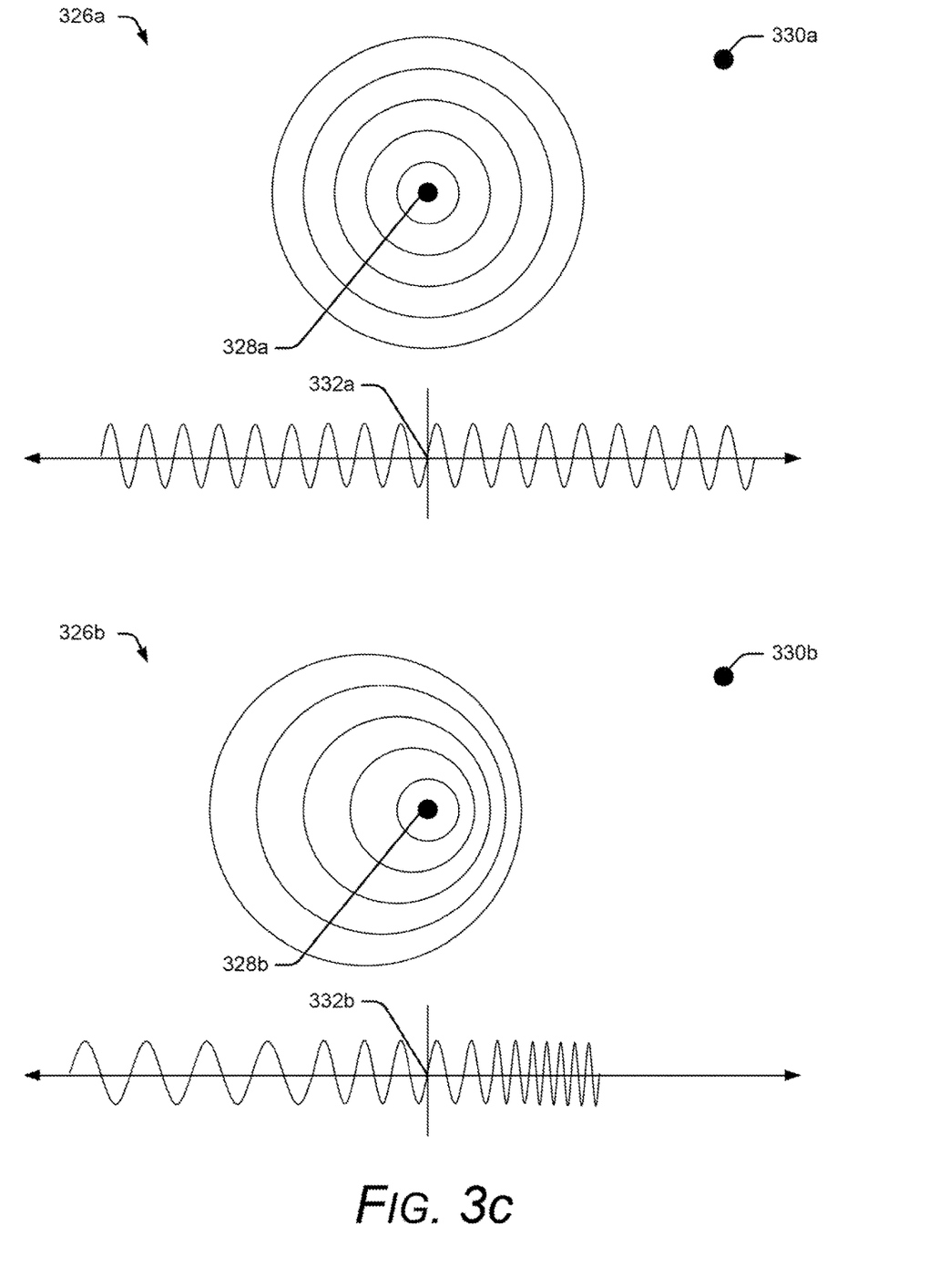

FIG. 3c generally demonstrates aspects of a Doppler shift on RF signals. For discussion purposes, the contents of this figure have been simplified and are not intended to cover all technical aspects associated with Doppler shifts. Graph 326a illustrates a baseline of an RF signal when signal source 328a and observer 330a are stationary relative to one another. Here, signal source 328a transmits signal 332a. The x-axis of signal 332a represents the signal propagation through space, where traversing the x-axis to the right of signal source 328a is the signal propagation towards observer 330a, and traversing the x-axis to the left of signal source 328a is the signal propagation away from observer 330a. Since signal source 328a and observer 330a are stationary relative to one another, signal 332a, as observed by observer 330a, has a constant frequency.

Conversely, graph 326b illustrates a scenario where signal source 328b and observer 330b are not stationary relative to one another. Consider a case where signal source 328b is transmitting signal 332b at a constant frequency in same manner as signal source 328a transmitting signal 332a, but observer 330b is moving towards signal source 328b. In this scenario, signal 332b, as observed by observer 330b, is received at a higher frequency than that transmitted by signal source 328b. Thus, traversing the x-axis of signal 332b to the right of signal source 328b represents signal propagation towards an object moving towards signal source 328b. This shortens the observed wavelength and increases the observed frequency. Traversing the x-axis of signal 332b to the left of signal source 328b represents signal propagation towards an object moving away from signal source 328b. This lengthens the observed wavelength and decreases the observed frequency of signal 332b. These frequency shifts can be observed in RF signals reflected off of observer 330b as well as lack of a frequency shift when reflected off of observer 330a and can further be used to identify when an observer is present, when the observer is in motion, and in which direction the observer is moving.

Having described basic RF signal properties, consider now a discussion of object detection in accordance with one or more embodiments. It can be advantageous for a mobile device, such as a mobile phone, to have knowledge of the relative presence of a user in order to run more efficiently. For example, the mobile phone can transition to a power-saving mode when the user has left the proximity of the mobile phone and transition out of the power-saving mode when the user is within the proximity of the mobile phone. However, consumers often want more efficient functionality from a wireless mobile device without impacting its purchase price.

Radio antennas are used in wireless communications to transmit and receive radio signals. To transmit a radio frequency, an antenna radiates electromagnetic waves based upon input from a transmitter. To receive a radio frequency, an antenna intercepts radiated energy and subsequently produces a small voltage that is then supplied to receiver circuitry. Oftentimes, an antenna is designed for a specific signal or frequency range to optimize its performance. Thus, a wireless mobile phone having multiple modes of wireless communication can include multiple antennas, some of which are designed for specific frequency ranges or signals. For instance, some mobile phones include a main transmit antenna designed for the specific purpose of transmitting cellular communications, a main receive antenna designed for the specific purpose of receiving cellular communications, a diversity antenna designed for improving wireless communications that have degradation due to multi-path situations, and a fourth (shared) antenna designed for transmitting and receiving both Wi-Fi and Bluetooth communications. While each antenna is designed for a specific purpose, this does not necessarily prevent it from transmitting or receiving other RF signals.

Various embodiments transmit an RF beam using two or more RF antennas of a mobile phone. At least some of the RF antennas are re-purposed, as noted above, for a secondary purpose pertaining to object detection. The RF beam can be constructed such that its projected electromagnetic radiation forms a select pattern in space. Through the use of constructive and destructive interference, portions of the RF beam can be used to identify when an object is present within the space of the projected electromagnetic radiation. Alternately or additionally, the RF beam can be used to determine properties of the object, such as size, shape, motion, and velocity.

An object within range of a projected electromagnetic radiation pattern, also referred to as an emission pattern, reflects at least a portion of the associated signal. Through analysis of the reflected signal, various properties of the object can be determined. Consider the case where the projected emission pattern is made up of RF signals transmitted from separate sources. When the RF signals are coherent and in sync with one another, the RF signals constructively and destructively interfere with one another, as described above. When the RF signals are transmitted in sync but at separate frequencies, a pattern of interference lines is created. Through careful selection of the frequencies, the wavelength between the interference lines can be controlled. Controlling the wavelength between interference lines translates to knowing the distance between the interference lines. Thus, when an object reflects a portion of the electromagnetic radiation pattern, the location of the object can be determined from the interference lines. Similarly, shifts between the frequencies of the RF signals that make up an RF beam can be controlled to generate a Doppler effect. The reflected signals can again be analyzed to determine whether the object is moving, the direction in which the object is moving, and the rate at which the object is moving.

At times, the selected emission pattern to transmit via the RF beam is based on the anticipated object to be detected. For example, detecting a person utilizes an emission pattern that traverses more volume in space than an emission pattern used for detecting a coffee mug. Accordingly, an emission pattern with more volume can be achieved by transmitting an RF beam using an array of antennas to radiate a wider breadth than an emission pattern with less volume. Here, the term array can be multiple antennas or a single compound element that is of complex shape. An emission pattern can have any suitable shape, such as various isotropic shapes (i.e., a vertical rectangular shape, horizontal rectangular shape, a circular shape, a spherical shape, etc.) or various non-uniform shapes. In some embodiments, the shape of the emission pattern affects the selection of antennas used in forming the associated RF beam.

Consider a case where a mobile phone is lying on a desk in a power-saving mode. In some embodiments, the mobile phone can attempt to determine when a user enters into close proximity in order to transition out of the power-saving mode. Accordingly, the mobile phone first selects an emission pattern capable of detecting an object with a large volume. Next, the mobile phone selects which antennas to use based upon the emission pattern. Various factors can be considered when selecting which antennas to use to emit the RF beam, such as the physical location of the antenna, the radiation capabilities of the antenna (i.e., frequency-transmission capabilities, transmission-strength capabilities, etc.), and so forth. For example, in order to transmit an RF beam with large-volume detection capabilities, some embodiments select antennas at opposite ends of the mobile phone in order to project an emission pattern over a larger area. Alternately or additionally, some embodiments can select antennas with strong signal-emission capabilities in order to detect objects further away. Thus, the emission pattern and the antenna capabilities can drive which antenna configuration is selected for the RF beam, especially when an antenna is being re-purposed. Specific-purpose antennas can be re-purposed to transmit portions of the RF beam associated with object detection in any suitable manner. For example, a main transmit antenna can be re-purposed to transmit a first RF signal of the RF beam, a diversity antenna can be re-purposed to transmit a second signal of the RF beam, and so forth. A main receive antenna can also be re-purposed to receive a reflected version of the RF beam.

At times, the emission pattern or the selected antenna for transmission can dynamically change. For instance, sometimes the RF beam may experience a blockage, such as a hand placed over a point of transmission. When this blockage is detected, some embodiments alter the selected antenna or the emission pattern of the RF beam to compensate for the blockage. In other instances, transmitted frequencies in the RF beam are altered to gain more or less resolution of a particular object. For example, decreasing the wavelength between interference lines, which can be controlled by altering the transmitted frequencies, increases the amount of information that can be extracted from the reflected RF beam about the reflecting object, while increasing the wavelength between interference lines decreases the amount of information that can be extracted from the reflected RF beam. Some embodiments initially transmit an RF beam with the potential of extracting less information. Upon detection of an object, however, the RF is dynamically altered to increase the amount of information that can be extracted. For example, consider a case of authenticating a user via an RF beam. In an authentication procedure, a first object-detection pass might utilize a configuration with less resolution to simply detect that a user is present within transmission range of the RF beam. Once the user has been detected, some embodiments alter the RF beam to transmit an emission pattern that yields more information in the reflected RF beam to authenticate that the object is a particular person who is recognized through distinct facial features. Depending upon the desired resolution and the resultant emission pattern to achieve the desired resolution, different antennas can be selected in order to switch the transmitted frequency band. The frequency band can be switched without altering the selected antenna with which to transmit or receive.

At times, switching the transmit antenna can depend upon the shape of the desired emission pattern of the RF beam. Consider a case where the desired emission pattern is a 360° space around a mobile phone. The 360° space can be any suitable dimension, such as a horizontal 360° space, a vertical 360° space, a spherical 360° space, and so forth. In some embodiments, the transmission of the RF beam is achieved with simultaneous transmissions at various antennas around the mobile phone. In other embodiments, the transmission of the RF beam is rotated through sets of antennas on the wireless mobile device (e.g., transmitting a first burst of the RF beam at a first set of antennas, transmitting a second burst of the RF beam at a second set of antennas, and so forth). While this example is described in the context of achieving a 360° space emission pattern, it is to be appreciated that this is merely for discussion purposes, in that any other suitable emission patterns can be utilized without departing from the scope of the claimed subject matter.

Some embodiments transmit the RF beam using a temporal pattern similar to that described above. To further illustrate, consider a case when a battery-powered mobile phone is continuously transmitting RF signals. Since the battery has finite power, constant transmission will eventually drain the battery of all its power. One way to extend the battery power is to transmit an RF signal in bursts rather than continuously. By transmitting on an antenna for short periods of time (e.g., in bursts), less power is consumed by the antenna as compared to the power consumed with a constant transmission. This can extend the battery life. Any suitable type of temporary transmission pattern can be utilized without departing from the scope of the claimed subject matter. For instance, the RF beam can be transmitted in periodic bursts, random bursts, bursts that increase in their transmission frequency over a span of time, bursts that decrease in their transmission frequency over a span of time, and so forth. In some cases, the RF beam can be transmitted in bursts until the presence of an object has been detected, at which point the transmission of the RF beam switches to a continuous mode until object detection is completed.

Altering the various properties of an RF beam allows a corresponding receiver to detect the presence of an object when the transmitted RF beam is reflected off the object. For instance, based upon the frequencies of the RF beam or the direction in which the RF beam was transmitted, one or more receiving antenna, and their corresponding receiver paths, can be selected to capture the reflected signal based upon location, respective receiving capabilities, and so forth. Further, the receiving antenna can be tuned to optimally receive signals around a respective center frequency or range of frequencies. Any suitable combination of antennas can be tuned as receiving antennas, and in any suitable manner. For instance, some embodiments tune a first receiving antenna to receive optimally at a first center frequency, a second antenna to receive optimally at a second center frequency, and so forth. Altering the respective center frequency that each respective antenna is tuned to can collectively increase the breadth of the received frequency range. Alternately or additionally, multiple receiving antennas can be tuned at the same center frequency. Centering each antenna at a same center frequency can collectively increase capturing signals with low power levels. Thus, the receiving antennas can each be optimized to receive a same range of frequencies centered on a same center frequency, or each receiving antenna can be optimized to receive at respective frequency ranges centered on respective center frequencies. Any suitable frequency can be utilized as a center receiving frequency, such as a transmit frequency, an expected Doppler frequency, and so forth.

When a reflected signal has been received, the reflected signal can be analyzed to determine properties associated with the object which reflected the signal. Examples of these properties are provided above. Signal analysis can be performed through the use of a digital signal-processing module that analyzes a sampled signal to determine various properties. Once an object or its properties have been determined, various actions can be performed automatically. These actions can include, by way of example and not limitation, terminating a power-saving mode, performing authentication of a user, automatically launching an application such as opening a calendar or clock application, turning a display on or off, locking or unlocking access to a device, and so forth.

Figure 4A:
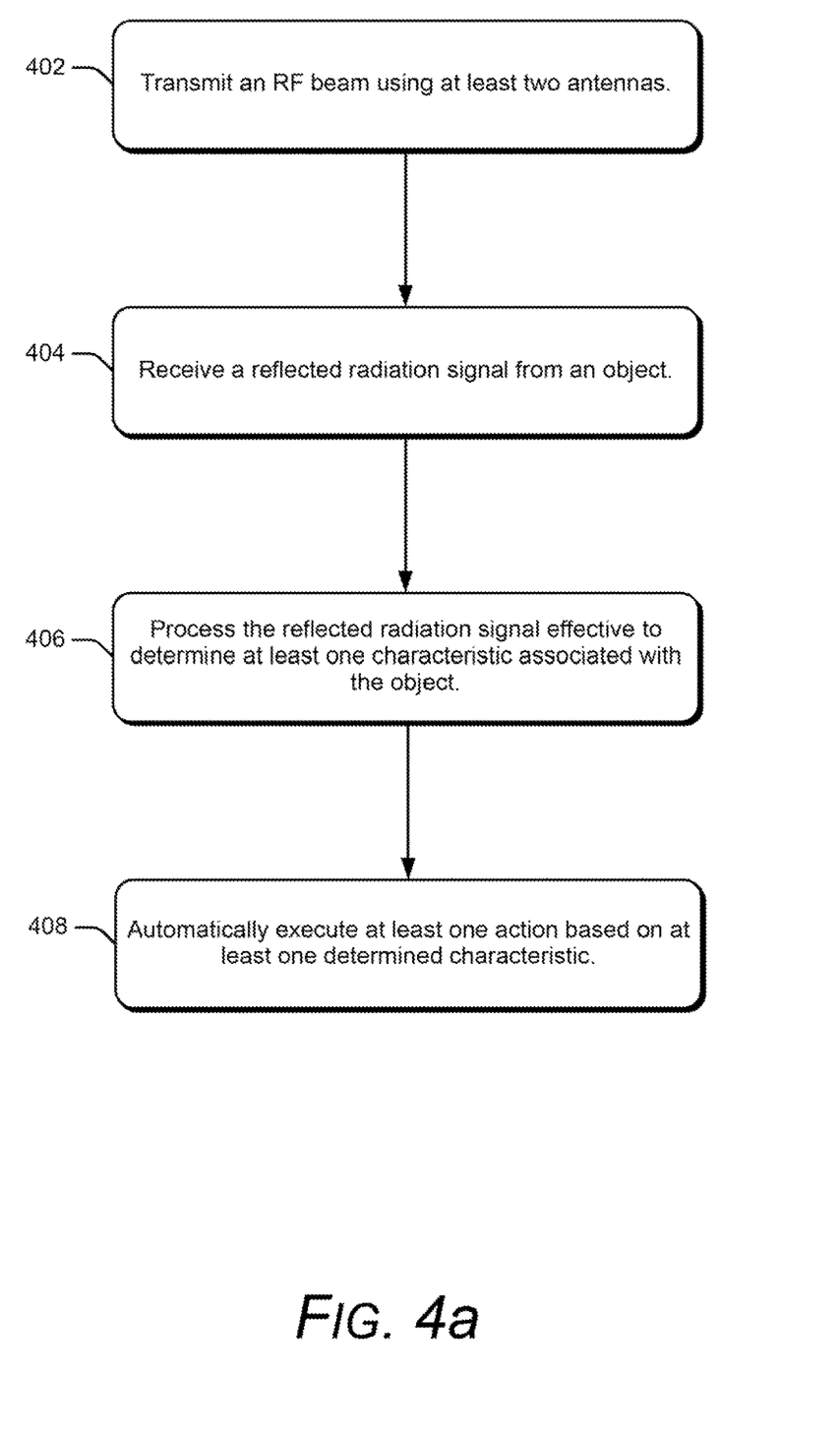
FIGS. 4a and 4b are flow charts of representative methods of detecting objects.
Figure 4B:
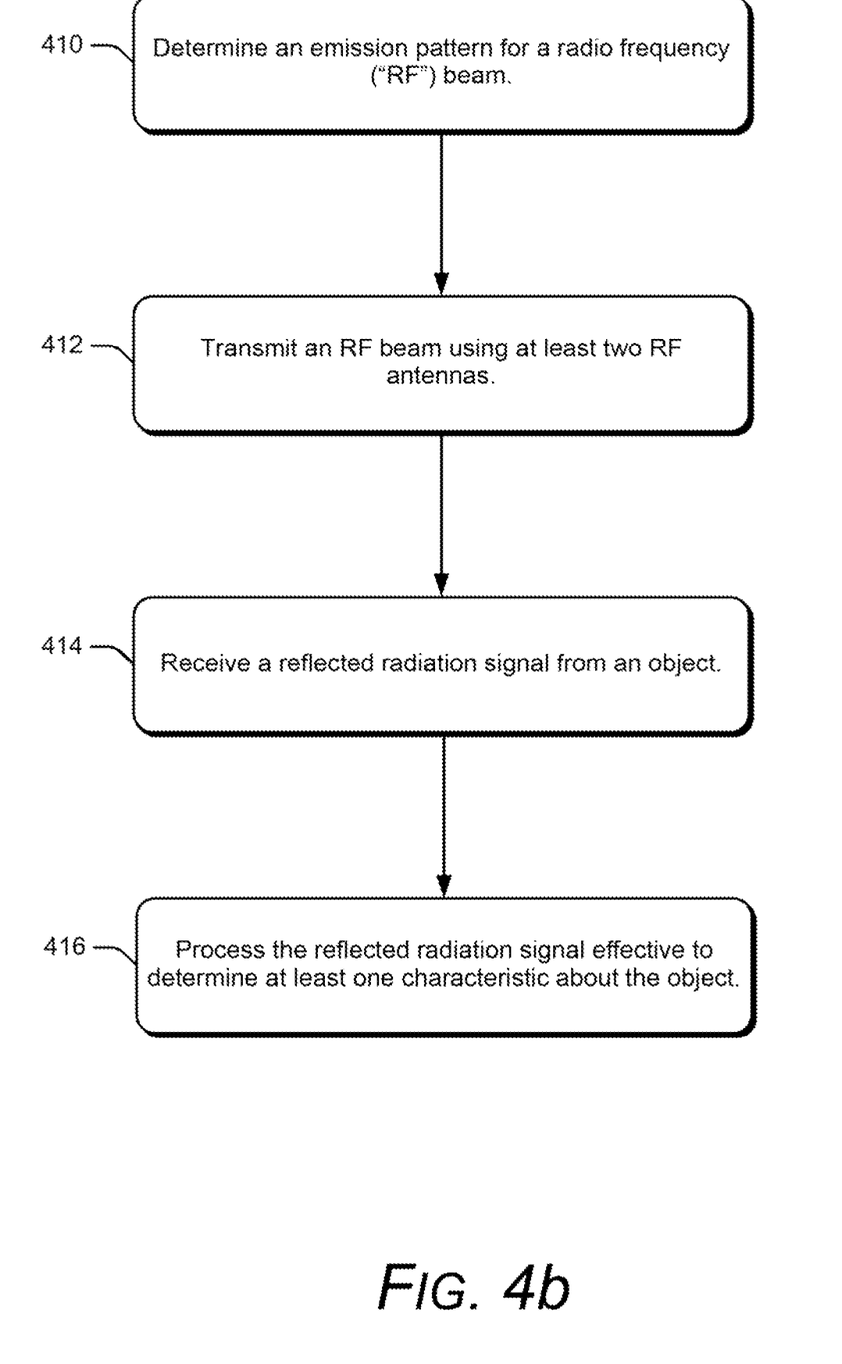

To further illustrate, consider FIG. 4a and FIG. 4b which illustrate flow charts that describes steps in methods that are in accordance with one or more embodiments. These methods can be performed by any suitable hardware, software, firmware, or combination thereof. In at least some embodiments, aspects of the methods can be implemented by one or more suitably configured software modules executing on a mobile device, such as a mobile phone, such as beam-former module 208 or signal-analysis module 210 of FIG. 2.

To begin, consider FIG. 4a. Step 402 transmits an RF beam using at least two antennas of a mobile phone. In some embodiments, some of the antennas are re-purposed from a primary purpose to transmit part of the RF beam. The primary purpose is different from object detection. As one example, an antenna can have a primary purpose as being configured and dedicated to a specific RF communication function. The RF beam can be configured in any suitable manner, examples of which are provided above.

Step 404 receives a reflected radiation signal from an object, such as a reflected portion of the RF beam transmitted above. The reflected radiation signal is received by at least one antenna of the mobile phone and, in some cases, by a receiving antenna that is re-purposed from an associated primary purpose, similar to that of the transmit antenna.

Responsive to receiving a reflected radiation signal, step 406 processes the reflected radiation signal effective to determine at least one characteristic associated with the object that reflected the RF beam, examples of which are provided above. Processing the reflected radiation can include sampling the signal and applying various digital signal-processing techniques.

Responsive to determining at least one characteristic associated with the object, step 408 automatically executes at least one action. This can include executing the action without physically receiving any user input by the mobile phone.

Now consider FIG. 4b. Step 410 determines an emission pattern for an RF beam. The emission pattern can be based on any suitable information. In some cases, the emission pattern is based upon an anticipated object to detect. In other cases, the emission pattern is based upon a desired resolution of information returned in a reflected signal. The emission pattern can be based upon the transmission capabilities of the device transmitting the RF beam.

Responsive to determining the emission pattern, step 412 transmits the RF beam using at least two antennas of the transmitting device. These antennas can be temporarily re-purposed antennas or can be antennas with a primary purpose of object detection via RF signals.

Responsive to transmitting the RF beam, step 414 receives a reflected radiation signal from an object. In some embodiments, the object is the anticipated object. In other embodiments, the object is a different object from the anticipated object. The reflected radiation signal can be received in any suitable manner, examples of which are provided above.

Responsive to receiving the reflected radiation signal, step 416 processes the reflected radiation signal effective to determine at least one characteristic about the object. For example, the reflected radiation signal can be processed and analyzed to determine whether the object that reflected the RF beam is the anticipated object, whether the object is moving, etc. When a particular characteristic is determined, some embodiments automatically perform a responsive action.

Figure 5:
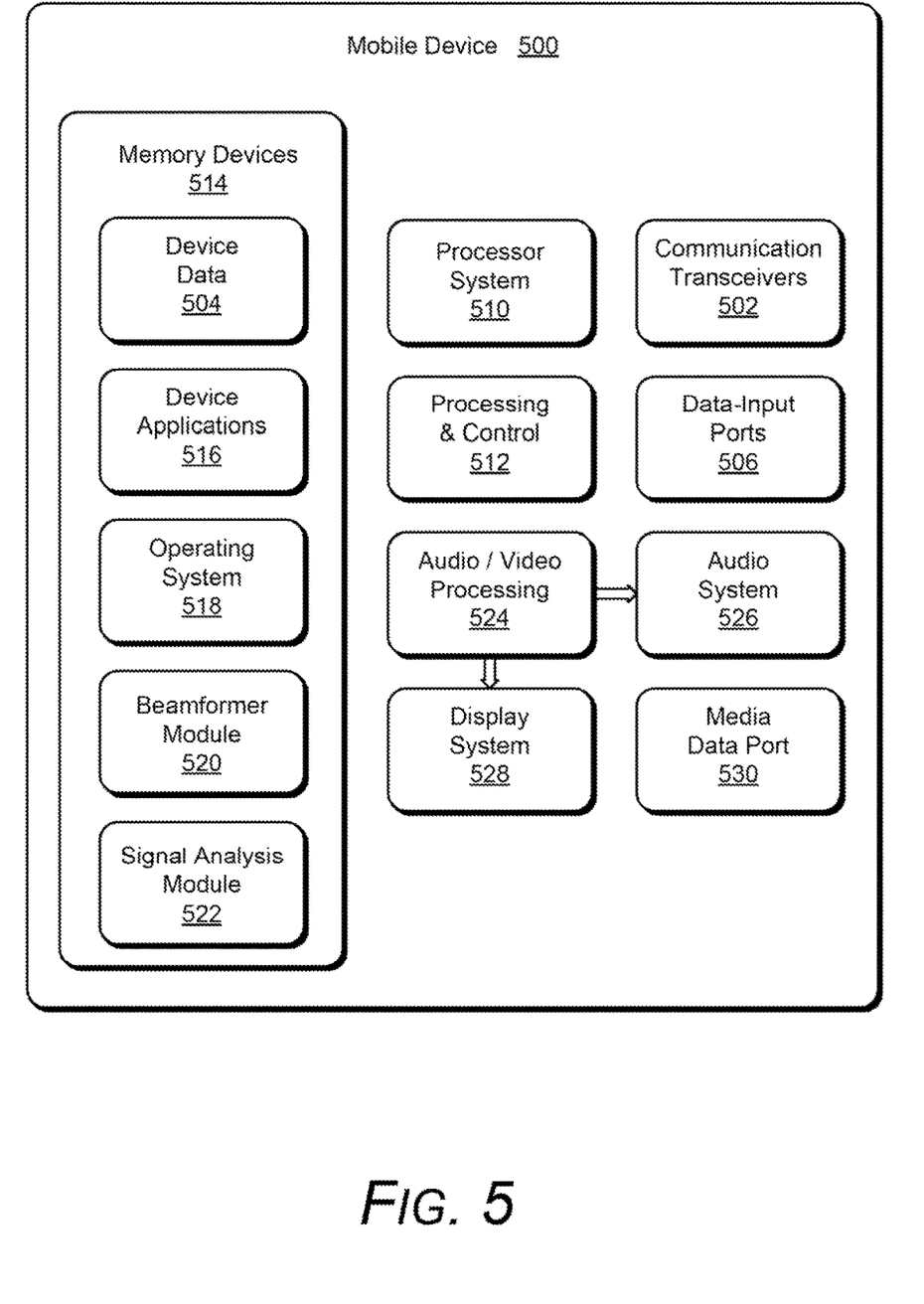
FIG. 5 is an illustration of a device that can use the present techniques.

Having considered a discussion of object detection through the use of an RF beam, consider now an example device that can be utilized to implement the embodiments described above. FIG. 5 illustrates various components of an example mobile device 500 that can be utilized to implement the embodiments described herein. Mobile device 500 can be, or include, many different types of devices capable of implementing object detection through the use of an RF beam. For example, mobile device 500 may include a phone, personal navigation device, gaming device, Web-browsing platform, pager, media player, or any other type of electronic device, such as the mobile phone 102 described with reference to FIG. 1 and FIG. 2.

Mobile device 500 includes communication transceivers 502 that enable wired or wireless communication of device data 504, such as received data and transmitted data. In some cases, device data 504 can include sampled signal data. The term transceivers is used here to generally refer to transmit and receive capabilities, such as RF antennas as further described above. While referred to as a transceiver, it is to be appreciated that transceivers 502 can additionally include separate transmit antennas and receive antennas without departing from the scope of the claimed subject matter. Example communication transceivers include radios compliant with various Institute of Electrical and Electronics Engineers ("IEEE") 802.15 standards, radios compliant with any of the various IEEE 802.11 standards, radios for cellular telephony, radios compliant with various IEEE 802.16 standards, and wired Ethernet transceivers.

Mobile device 500 may also include data-input ports 506 via which any type of data, media content, and inputs can be received, such as user-selectable inputs, messages, music, television content, recorded video content, and any other type of audio, video, or image data received from any content or data source. Data-input ports 506 may include universal serial bus ports, coaxial-cable ports, and other serial or parallel connectors (including internal connectors) for flash memory, digital versatile discs, compact discs, and the like. These data-input ports 506 may be used to couple the electronic device 500 to components, peripherals, or accessories such as keyboards, microphones, or cameras.

Mobile device 500 of this example includes processor system 510 (e.g., any of application processors, microprocessors, digital-signal processors, controllers, and the like) or a processor and memory system (e.g., implemented in a system-on-chip), which processes computer-executable instructions to control operation of the device 500. A processing system 510 may be implemented at least partially in hardware, which can include components of an integrated circuit or on-chip system, digital signal processor, application-specific integrated circuit, field-programmable gate array, a complex programmable logic device, and other implementations in silicon and other hardware. Alternatively or in addition, the electronic device 500 can be implemented with any one or combination of software, hardware, firmware, or fixed-logic circuitry that is implemented in connection with processing and control circuits, which are generally identified at 512. Although not shown, mobile device 500 can include a system bus, crossbar, interlink, or data-transfer system that couples the various components within the device 500. A system bus can include any one or combination of different bus structures, such as a memory bus or memory controller, data protocol/format converter, a peripheral bus, a universal serial bus, a processor bus, or local bus that utilizes any of a variety of bus architectures.

Mobile device 500 also includes one or more memory devices 514 that enable data storage, examples of which include random access memory, non-volatile memory (e.g., read-only memory, flash memory, etc.), and a disk storage device. Memory devices 514 are implemented at least in part as a physical device that stores information (e.g., digital or analog values) in storage media, which does not include propagating signals or waveforms. The storage media may be implemented as any suitable types of media such as electronic, magnetic, optical, mechanical, quantum, atomic, and so on. Memory devices 514 provide data-storage mechanisms to store the device data 504, other types of information or data, and various device applications 516 (e.g., software applications). For example, operating system 518 can be maintained as software instructions within memory devices 514 and executed by processors 510. In some aspects, beam-former module 520 and signal-analysis module 522 are embodied in memory devices 514 of electronic device 500 as executable instructions or code. Although represented as a software implementation, beam-former module 520 and signal-analysis module 522 may be implemented as any form of a control application, software application, signal processing and control module, firmware that is installed on the device, a hardware implementation of the controller, and so on.

Mobile device 500 also includes audio- and video-processing system 524 that processes audio/video data and passes through the audio and video data to audio system 526 and to display system 528. Audio system 526 and display system 528 may include any modules that process, display, or otherwise render audio, video, display, or image data. Display data and audio signals can be communicated to an audio component and to a display component via a radio-frequency link, S-video link, high-definition multimedia interface, composite-video link, component-video link, digital-video interface, analog-audio connection, or other similar communication link, such as media-data port 530. In some implementations, audio system 526 and display system 528 are external components to electronic device 500. Display system 528 can be an integrated component of the example electronic device 500, such as part of an integrated display and touch interface.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An object-detection method comprising:
   selecting, using a mobile device that includes multiple antenna, a first emission pattern of a first radio frequency (RF) beam for detecting a presence of an object;
   selecting, using the mobile device, a first antenna from the multiple antenna to use to transmit the first RF beam, the first antenna being re-purposed from a primary purpose associated with wireless communications with another device to a secondary purpose associated with transmitting or receiving the first RF beam;
   transmitting the first RF beam via at least the first antenna;

receiving, using the mobile device, a first reflected radiation signal from the object, the first reflected radiation signal based, at least in part, on the first RF beam;
processing, using the mobile device, the first reflected radiation signal effective to determine the presence of the object;
determining, using the mobile device, a second emission pattern for a second RF beam in a different frequency band than the first RF beam, the second emission pattern based, at least in part, on the presence of the object;
identifying, using the mobile device, a second RF antenna of the plurality of RF antenna to use for transmitting the second RF beam based, at least in part, on the different frequency band;
transmitting, using the mobile device, the second RF beam by replacing the first RF antenna with the second RF antenna to transmit the second RF beam;
receiving, using the mobile device, a second reflected radiation signal from the object, the second reflected radiation signal based, at least in part, on the second RF beam;
processing, using the mobile device, the second reflected radiation signal effective to determine one or more characteristics of the object; and
automatically executing, using the mobile device, at least one action based on the one or more determined characteristics.

2. The object-detection method of claim 1 wherein at least one of the first emission pattern or the second emission pattern comprises at least two interference lines.

3. The object-detection method of claim 1 wherein the one or more determined characteristics further comprise a velocity associated with the object.

4. The object-detection method of claim 1 wherein the first antenna comprises an antenna associated with wireless local area network communications.

5. The object-detection method of claim 1 wherein receiving the first reflected radiation signal further comprises receiving the first reflected radiation signal by reconfiguring the first antenna from cellular communications to a configuration based on receiving the first reflected radiation signal at a center frequency that is different from a center frequency associated with the cellular communications.

6. A mobile device comprising:
multiple radio-frequency ("RF") antennas;
a processor; and
a computer-readable memory storage device comprising processor-executable instructions which, responsive to execution by the processor, cause the mobile device to perform operations comprising:
  determining a first emission pattern for a first RF beam configured to enable detection of a presence of an object;
  re-purposing a first antenna of the multiple RF antennas from a primary purpose associated with wireless communications with other devices to a secondary purpose associated with transmitting the first RF beam;
  transmitting the first RF beam via at least the first antenna;
  receiving a first reflected radiation signal from the object, the first reflected radiation signal based, at least in part, on the first RF beam;
  processing the first reflected radiation signal effective to determine the presence of the object;
  determining a second emission pattern for a second RF beam in a different frequency band than the first RF beam, the second emission pattern based on detecting the presence of the object via the first RF beam;
  selecting a second RF antenna of the multiple RF antennas to use for transmitting the second RF beam based, at least in part, on the different frequency band;
  transmitting the second RF beam via at least the second RF antenna;
  receiving a second reflected radiation signal from the object, the second reflected radiation signal based, at least in part, on the second RF beam;
  processing the second received radiation pattern effective to determine one or more characteristics associated with the object; and
  automatically executing an action based, at least in part, on the one or more characteristics associated with the object.

7. The mobile device of claim 6 wherein the one or more characteristics associated with the object comprises a proximity of the object to the mobile device.

8. The mobile device of claim 6 wherein said transmitting the first RF beam comprises transmitting the first RF beam in bursts.

9. The mobile device of claim 8 wherein said transmitting the first RF beam comprises rotating transmission of the first RF beam through the multiple RF antennas.

10. The mobile device of claim 6, wherein the operations further comprise:
  determining that a direction of movement associated with the object is associated with the object leaving a region of transmission associated with the mobile device; and
  automatically transitioning into a power-saving mode in response to said determining.

11. The mobile device of claim 6 wherein the multiple RF antennas comprise one or more of:
  a main transmit antenna purposed for cellular communications,
  a main receive antenna purposed for cellular communications,
  a wireless local area network ("Wi-Fi") antenna purposed for Wi-Fi communications,
  a Bluetooth antenna purposed for Bluetooth communications, or
  a diversity antenna purposed for multi-path improvement.

12. The mobile device of claim 6 wherein at least one of the first emission pattern or the second emission pattern comprises an isotropic shape.

13. An object-detection method comprising:
  determining, using a mobile device with a plurality of radio-frequency (RF) antennas, a first emission pattern for a first RF beam, the emission pattern based, at least in part, on detecting one or more characteristics associated with an object using the first RF beam;
  transmitting, using the mobile device, the first RF beam using at least two RF antennas of the plurality of RF antennas by re-purposing a first RF antenna of the plurality of RF antennas from a primary purpose associated with wireless communications with one or more other devices to a secondary purpose associated with transmitting the first RF beam;
  receiving, using the mobile device, a reflected radiation signal from the object, the reflected radiation signal based, at least in part, on the first RF beam;

processing, using the mobile device, the reflected radiation signal effective to determine a presence of the object;

determining, using the mobile device, a second emission pattern for a second RF beam in a different frequency band than the first RF beam, the second emission pattern based, at least in part, on the presence of the object;

identifying, using the mobile device, a second RF antenna of the plurality of RF antenna to use for transmitting the second RF beam based, at least in part, on the different frequency band; and transmitting the second RF beam by replacing the first RF antenna with the second RF antenna to transmit the second RF beam.

14. The object-detection method of claim 13 wherein determining the first emission pattern further comprises:

determining a respective frequency for each respective RF signal of the first RF beam based, at least in part, on resultant constructive and destructive interference in the first emission pattern.

15. The object-detection method of claim 13 wherein determining the first emission pattern further comprises:

determining a respective frequency for each respective RF signal of the first RF beam based, at least in part, on a resultant Doppler Effect in the first emission pattern.

16. The object-detection method of claim 13, wherein said determining the second emission pattern further comprises configuring the second RF beam to obtain more resolution with respect to the object than the first RF beam.

17. The object-detection method of claim 13 wherein the object comprises a person.

18. The object detection method of claim 17, wherein said processing the reflected radiation signal effective to determine the one or more characteristics further comprises authenticating the person.

19. The mobile device of claim 6, wherein said selecting the second antenna comprises selecting the second antenna based on at least one of:

a location of the second antenna on the mobile device; or one or more radiation capabilities of the second antenna.

20. The mobile device of claim 6, wherein the action comprises unlocking access to the mobile device.

\* \* \* \* \*